E. L. PETERSON.
GARDEN TOOL.
APPLICATION FILED APR. 22, 1919.
1,328,191.
Patented Jan. 13, 1920.
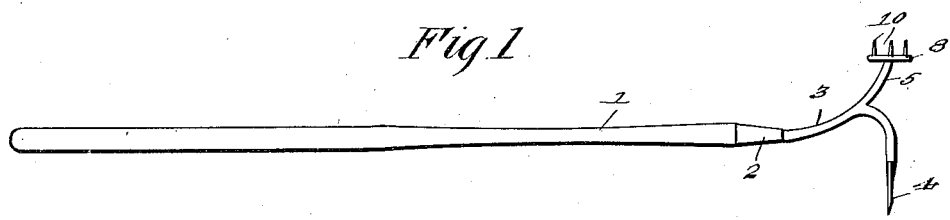
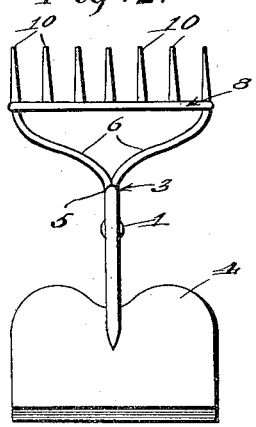
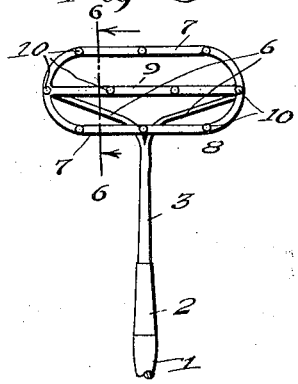
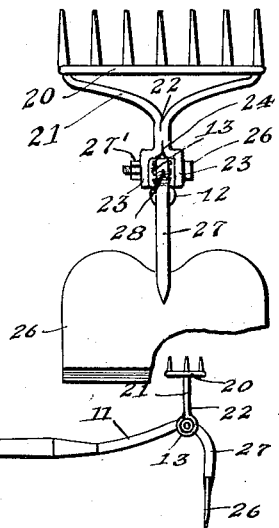
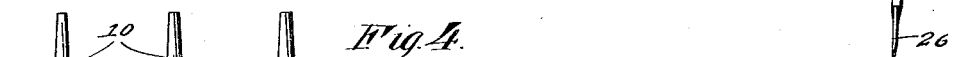
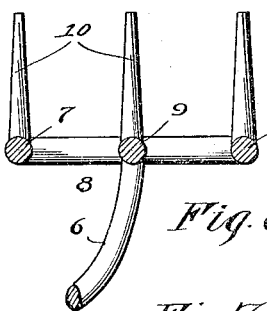
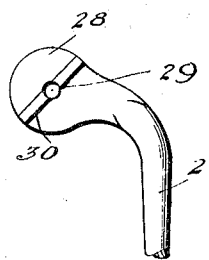
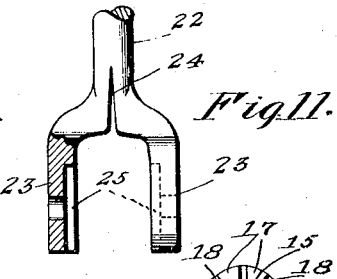
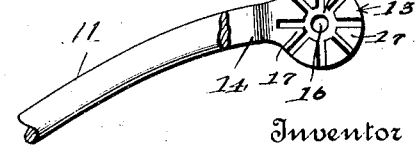
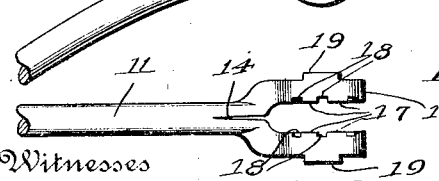
Inventor
Eldon L. Peterson
Witnesses
R. A. Thomas
By Victor J. Evans
Attorney

UNITED STATES PATENT OFFICE.

ELDON L. PETERSON, OF TACOMA, WASHINGTON.

GARDEN-TOOL.

1,328,191. Specification of Letters Patent. Patented Jan. 13, 1920.

Application filed April 22, 1919. Serial No. 291,794.

*To all whom it may concern:*

Be it known that I, ELDON L. PETERSON, a citizen of the United States, residing at Tacoma, in the county of Pierce and State of Washington, have invented new and useful Improvements in Garden-Tools, of which the following is a specification.

This invention has reference to a garden tool.

An object of the invention is to produce a combination garden tool in the nature of a hoe and a clod breaker disposed opposite the hoe.

It is a further object of the invention to produce a combination garden tool including a blade and a clod breaker or pulverizer disposed opposite the blade, and to provide means whereby either of these elements may be adjusted with respect to each other and with respect to the handle supporting the same.

Other objects and advantages will present themselves as the nature of the invention is better understood, reference being had to the accompanying drawings, in which:

Figure 1 is a side elevation illustrating one form of the improvement.

Fig. 2 is a front elevation thereof.

Fig. 3 is a plan view looking on the clod breaker.

Fig. 4 is a side elevation of a modification.

Fig. 5 is an end view thereof.

Fig. 6 is a greatly enlarged sectional view approximately on the line 6—6 of Fig. 3.

Fig. 7 is a fragmentary view in side elevation of the headed portion of the shank illustrated in Fig. 4.

Fig. 8 is a top plan view thereof.

Fig. 9 is a side elevation of the same, one of the sides of the bifurcated head being broken away to disclose the inner face of the second side of the head.

Fig. 10 is a detail side elevation of the headed end of the shank 27.

Fig. 11 is an end view of the yoke end of the stem 22, parts being broken away and parts being in section.

In Figs. 1, 2 and 3 the implements embodied in my improved garden tool are rigidly associated, while in the remaining figures the said implements are adjustable with respect to the supporting handle of the tool.

Broadly speaking, the improvement comprises a handle 1 having its outer end receiving a socket 2 formed or connected with a slightly curved shank 3. On the outer end of the shank, and disposed angularly with respect to the shank is integrally formed a hoe blade 4. The shank, at the connection of the hoe blade 4 therewith is provided with an oppositely arranged extension 5, the same being bifurcated or slotted at its outer end to provide spaced arms 6 on which are formed or to which are connected the longitudinal and parallel members 7 of a substantially U-shaped frame 8. The frame has its round ends centrally connected with an intermediate arm 9, and both the arms 7 and 9 are provided with outstanding prongs 10. These prongs, in combination with the frame, serve as means for breaking and pulverizing the soil dug by the hoe.

The above, as stated, broadly refers to both forms of the construction, but is particularly directed to the forms disclosed in Figs. 1 to 3. In the remaining figures of the drawing the shank 11 connected with the operating handle 12 has its outer end provided with a round head 13 that is centrally bifurcated, and the shank, in a line with the said bifurcation is slitted as at 14. The round spaced members providing the head 13, upon the inner faces thereof have round sockets 15 and round openings 16 arranged centrally of the sockets. The confronting faces of the head members are formed with radially disposed ribs and intersecting grooves indicated by the numerals 17 and 18 respectively. The members comprising the head, upon the outer faces thereof are centrally formed with bosses 19.

The clod breaker or soil pulverizer is indicated by the numeral 20 and is substantially similar to that previously described. The frame of the member 20 has its outer arms connected with a yoke 21 formed on a centrally disposed stem 22, the said stem being widened at its outer end and bifurcated to provide spaced head members 23. The stem between the head members is slotted as at 24. The head members, upon their inner faces are formed with sockets 25, and these sockets are designed to receive the bosses 19 on the sectional head 13 of the shank 11.

The hoe blade is indicated by the numeral 26 and has an extending shank 27 provided with a round head 28. This head has a central opening 29 therethrough. The head 28 of the hoe blade has its faces ribbed as at 30 and these ribs are designed to co-engage with the radially disposed ribs and grooves 17 and 18 on the inner faces of the bifurcated head 13. It should have been stated that the outer face of the bifurcated head 13 is preferably ribbed and that the inner faces of the bifurcated head 23 of the pulverizing member 20 are likewise ribbed. These ribs co-act when the head 23 is arranged over the head 13 of the shank 11. Passing through alining openings in the head portions of the pulverizer, the hoe blade and the shank 11 is a bolt 26, and this bolt is engaged by a nut 27'. By adjusting the nut on the bolt it will be seen that either the pulverizer or the blade may be swung angularly with respect to each other and with respect to the shank of the head 11, so that both the blade and the pulverizer may be adapted for use by persons of different statures and also that the tool may be thus arranged conveniently for various work required therefrom.

It is believed, from the foregoing description, when taken in connection with the drawings, the simplicity of the construction and the advantages thereof will be apparent without further detailed description.

Having thus described the invention, what is claimed as new, is:—

In combination with a handle member having a shank provided with a slotted head formed with bosses on the outer side thereof and having both of its faces provided with radially disposed ribs and its inner face formed with a central socket, a member having a shank provided with a round head, the face of which being ribbed to co-engage with the ribs on the head of the shank when the same is received in the slotted head thereof, a second member having a shank which terminates in a widened and bifurcated head, the said head having sockets therein and having ribs outward of the sockets, said sockets designed to engage with the bosses on the outer face of the head of the shank of the handle and the ribs of the head on the said second member co-engaging with the ribs on the outer faces of the head of the shank of the handle, and means passing centrally through the co-engaging heads of the handle shank and the members for adjustably connecting the members to the shank of the handle and to each other.

In testimony whereof I affix my signature.

ELDON L. PETERSON.